No. 818,519. PATENTED APR. 24, 1906.
M. J. CONNORS.
VALVE.
APPLICATION FILED SEPT. 22, 1904.

2 SHEETS—SHEET 1.

Inventor
MICHAEL J. CONNORS

Witnesses
J. L. Mockabee
E. L. Rowzee

By Edson Bros.
Attorneys

No. 818,519. PATENTED APR. 24, 1906.
M. J. CONNORS.
VALVE.
APPLICATION FILED SEPT. 22, 1904.
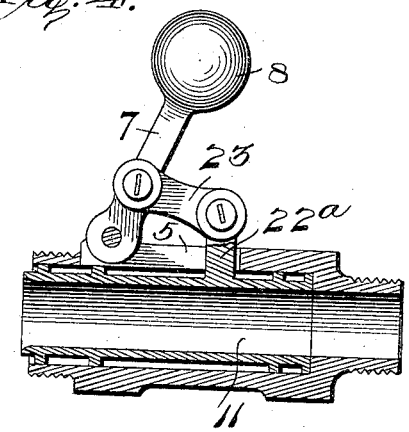
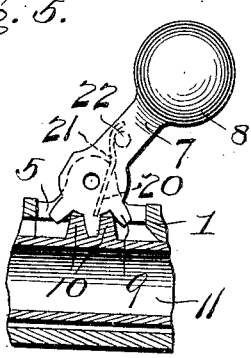
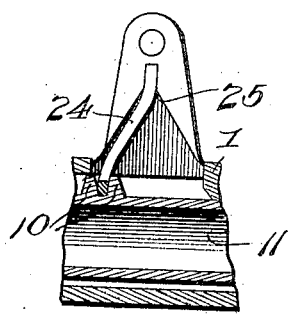
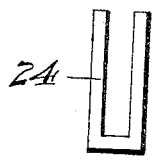
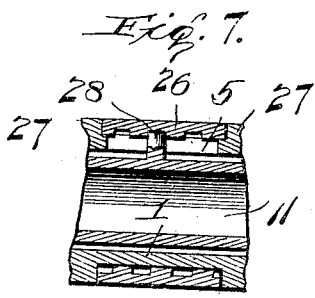
Inventor
MICHAEL J. CONNORS.

UNITED STATES PATENT OFFICE.

MICHAEL J. CONNORS, OF KANSAS CITY, MISSOURI.

VALVE.

No. 818,519.   Specification of Letters Patent.   Patented April 24, 1906.

Application filed September 22, 1904. Serial No. 225,521.

*To all whom it may concern:*

Be it known that I, MICHAEL J. CONNORS, a citizen of the United States, residing at Kansas City, in the county of Jackson and State of Missouri, have invented certain new and useful Improvements in Valves; and I do hereby declare the following to be a full, clear, and exact description of the invention, such as will enable others skilled in the art to which it appertains to make and use the same.

My invention relates to valves for steam, water, or air mechanism.

It has for its object to provide a novel form of valve which is simple in construction, cheap of manufacture, and which may be normally held in a closed position.

The invention consists, broadly, of a longitudinally-movable tube mounted within air-tight packing-rings in an outer casing which is provided with a water-tight chamber at one end, into which the end of said tube may be pushed to shut off the flow. When the tube is withdrawn, the liquid passes through a by-pass around said water-tight chamber.

The invention also consists in certain means for automatically operating the tube to shut off the valve and in the other details of construction and combinations of parts hereinafter described, and more particularly pointed out in the claims.

Figure 1:
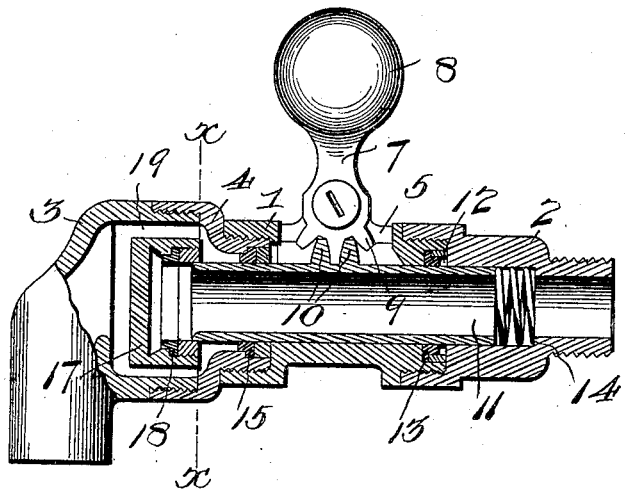
Figure 2:
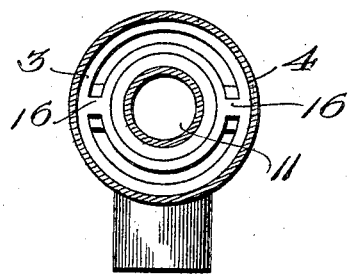
Figure 3:
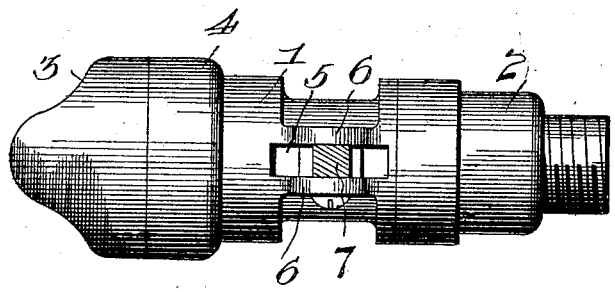

In the accompanying drawings, illustrating the preferred embodiment of the invention, Figure 1 is a longitudinal view of the valve with its parts assembled and a coiled spring placed behind the tube, holding it normally closed. Fig. 2 is a cross-sectional view taken on the line $x\,x$ of Fig. 1. Fig. 3 is a top plan view of the valve with the handle or knob broken away. Fig. 4 is a sectional view of a valve provided with a different means of operating the same, consisting of a lever and link, a portion of the casing being broken away to disclose the construction of the slidable tube. Fig. 5 is a broken sectional view showing the arrangement of the inclined lever for actuating the valve. Fig. 6 is a broken view showing a bent spring arranged to automatically operate the valve, and Fig. 7 is a longitudinal sectional view of a modified form of valve having a screw-ring to operate it. Fig. 8 is a detailed view of spring 24.

Although the preferred embodiment of my invention is fully shown in the accompanying drawings and the construction and operating drawings are described in the following specification, the right is reserved to make such change from the constructions shown and described as the scope of the claims hereto appended will permit.

In carrying out my invention I provide a casing comprising a central portion 1, end portions 2 and 3, and an intermediate ring 4, arranged between the central portion and the end portion 3. The casing as a whole is generally cylindric in form. The central portion has a slot 5 in its upper surface and two upstanding arms 6, one on each side of said slot. A hand-lever 7, having an enlarged head 8, is pivoted between said arms 6 and has a series of gear-teeth 9 on its lower end. Said teeth engage lugs or teeth 10 on the cylinder or tube 11, which is mounted to move within the casing. One end of the central portion of the casing is externally screw-threaded to receive the end piece 2. A circular recess 12 is provided in this end of the central portion for packing-rings 13, which may be of leather or other suitable material. The bore of the greater portion of said end piece is the same as that of said central casting to permit the tube or cylinder to extend thereinto; but a step 14 is formed where the bore is restricted to confine said tube. The other end of the central casting is internally screw-threaded to receive one end of the connecting-ring 4, the other end of said connecting-ring being internally-screw-threaded to receive the externally screw-threaded end piece 3. A recess is provided between the connecting-ring and the central piece for packing-rings 15.

Fixedly arranged within the end piece 3 and held in place by integral tie-arms 16 is a chamber 17, opening toward the slidable tube. Said chamber is packed, as at 18, at its opening, so that it fits around the end of said tube when the latter is pushed into engagement therewith, making a water-tight joint and effectively cutting off the flow. When the tube is withdrawn, the liquid passes around the chamber 17 by the by-pass 19. The chamber 17 should be air-tight, so that when the end of the tube is thrust into engagement therewith all flow through said tube will be entirely cut off. The weight of the handle shown in Fig. 1 of the drawings may be sufficiently great to normally hold said tube in engagement with said chamber by virtue of said handle always lying off center, or the lever or handle may be inclined rearward, as in Fig. 5. In this construction a groove 20 is formed in one of the arms, between which the handle-lever is pivoted, into which groove is inserted a flat spring 21, adapted to bear against a pin 22 on said handle, thereby pressing the latter rearward when released and shutting off the valve.

Other means of operating the valve are shown in Figs. 4, 6, and 7. In the first of these figures the lever is pivoted at one end portion of the casing and the tube has a shank or arm $22^a$ projecting through the slot in the casing, said arm $22^a$ and the handle being connected pivotally together by a link 23. In Fig. 6 a bent spring 24 is inserted into the slot in the casing of the construction shown in Fig. 1, said spring lying between the two teeth or lugs on the tube with each of the ends of said spring extending into a groove 25 in opposite sides of the casing. The tendency of said spring is to normally shut off the valve. In the construction shown in Fig. 7 a loose internally-threaded nut 26 is mounted around the central portion of the casing and confined between the enlarged ends 27 thereof. A shank or pin 28, fixed to the tube, extends through the slot in the casing and into the groove between the threads of the nut, whereby when the nut is turned the tube is moved endwise to operate the valve. The thread in the nut is preferably square to render its movement easy. Still other devices for operating the valve may be used without departing from the spirit or sacrificing the advantages of my invention.

My construction whereby I provide a water-tight chamber into which the tube is adapted to be thrust is a great advantage over merely bringing the end of the tube in contact with a solid seat in that when the end of the tube is pressed into said chamber within the packing-ring it will hold its position of its own accord and will constitute a positive cut-off. Were the end of the tube brought into engagement with a solid seat, it would be necessary to apply a continuous external pressure to keep it in such contact and prevent leakage.

Having thus described my invention, what I claim as new, and desire to secure by Letters Patent, is—

1. A valve comprising a casing having a water-tight chamber at one end with a by-pass therearound, and an endwise-movable tube open at both ends and arranged within said casing one end of said tube adapted to be inserted into said chamber to shut off the flow while the other end remains always open.

2. A valve comprising a casing having a water-tight chamber at one end with a by-pass therearound, an endwise-movable tube open at both ends arranged within said casing, and means to actuate said tube to thrust one end thereof into said chamber to stop the flow or to withdraw said tube to permit the flow through the by-pass.

3. A valve comprising a casing having a slot therein and a water-tight chamber at one end with a by-pass therearound, an endwise-movable tube open at both ends and arranged within said casing, and means extending into the slot in said casing to actuate said tube to thrust one end thereof into said chamber to stop the flow or withdraw said tube to permit the flow through the by-pass.

4. A valve comprising a casing having a slot therein and a water-tight chamber at one end with a by-pass therearound, an endwise-movable tube open at both ends and arranged within said casing, and means attached to said casing and tube extending into the slot in said casing to actuate said tube to thrust one end thereof into said chamber to stop the flow or withdraw said tube to permit the flow through the by-pass.

5. A valve comprising a casing having a slot therein and a water-tight chamber at one end with a by-pass therearound, an endwise-movable tube open at both ends and arranged within said casing adapted to have one end thereof thrust into said chamber to stop the flow or withdrawn therefrom to permit the flow through the by-pass, and means extending through the slot in the casing and connecting with the tube, to actuate said tube.

6. A valve comprising a casing having a slot therein and a water-tight chamber at one end with a by-pass therearound, an endwise-movable tube arranged within said casing adapted to be thrust into said chamber to stop the flow or withdrawn therefrom to permit the flow through the by-pass, a hand-lever pivoted to said casing and means on said tube extending into the slot in the casing for connecting said lever and tube for actuating the latter.

7. A valve comprising a casing having a slot therein and a water-tight chamber at one end with a by-pass therearound, an endwise-movable tube arranged within said casing adapted to be thrust into said chamber to stop the flow or withdrawn therefrom to permit the flow through the by-pass, a hand-lever pivoted to said casing, means extending into the slot in the casing for connecting said lever and tube for actuating the latter, and means to automatically close the valve.

8. A valve comprising a casing having a slot therein and a water-tight chamber at one end with a by-pass therearound, an endwise-movable tube arranged within said casing adapted to be thrust into said chamber to stop the flow or withdrawn therefrom to permit the flow through the by-pass, a hand-lever pivoted to the casing and having gear-teeth at its lower end extending into the slot of the casing, said tube also having teeth or lugs adapted to be engaged by the teeth on said lever for actuating said tube.

9. A valve comprising a casing having a slot therein and a water-tight chamber at one end with a by-pass therearound, an endwise-movable tube arranged within said casing adapted to be thrust into said chamber to stop the flow or withdrawn therefrom to permit the flow through the by-pass, a hand-lever pivoted to the casing and having gear-teeth at its lower end extending into the slot of the casing, said tube also having teeth or lugs adapted to be engaged by the teeth on said lever for actuating said tube, and a coiled spring arranged between the end of the tube and the inner end wall of the casing to automatically close the valve.

10. A valve comprising a casing having a slot therein and a water-tight chamber in one end thereof with a by-pass therearound, a hand-lever pivoted to said casing, an endwise-movable tube arranged within said casing and adapted to have one end thereof thrust into said chamber to stop the flow and withdrawn therefrom to permit the flow through the by-pass, said tube also having a lug extending into the slot in said casing for connection with said hand-lever.

11. A valve comprising a casing having a slot therein and a water-tight chamber at one end with a by-pass therearound, an endwise-movable tube arranged within said casing adapted to be thrust into said chamber to stop the flow or withdrawn therefrom to permit the flow through the by-pass, a hand-lever pivoted to the casing and having gear-teeth at its lower end adapted to engage similar teeth on the tube through the slot in the casing, said teeth so arranged on said lever that said lever normally stands in an inclined position, said lever also having a laterally-projecting pin engaged by a spring fixed to the casing, said spring normally holding the lever in such position as to close the valve.

12. A valve comprising a casing made in sections having the joints therebetween suitably packed, one section of said casing having a slot therein, another section provided with a water-tight chamber arranged therein with a by-pass therearound, an endwise-movable tube mounted in said first-mentioned section and adapted to have one end thereof thrust into said chamber to stop the flow, and means, to actuate said tube, having connection therewith through said slot.

In testimony whereof I affix my signature in presence of two witnesses.

MICHAEL J. CONNORS.

Witnesses:
P. J. HEDDERMAN,
THOMAS A. BALDWIN.